April 21, 1931.  C. C. FARMER  1,801,856
BRAKE CONTROLLING VALVE
Filed Jan. 21, 1930
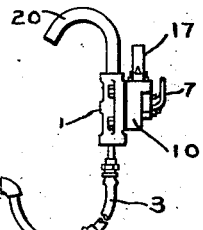
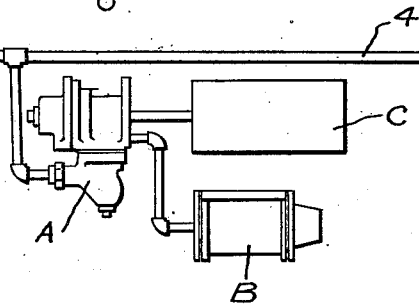
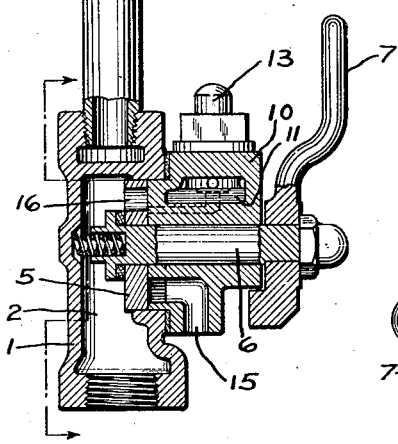
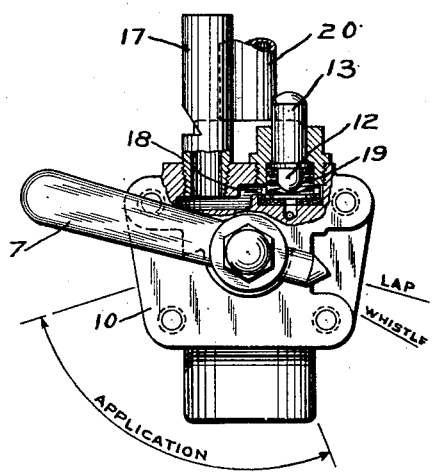
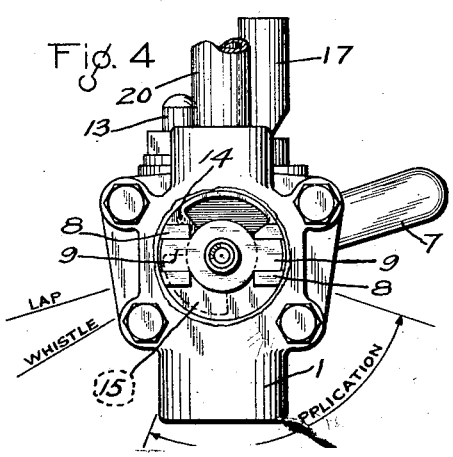
INVENTOR
CLYDE C. FARMER
BY *Wm. W. Cady*
ATTORNEY Patented Apr. 21, 1931

1,801,856

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE-CONTROLLING VALVE

Application filed January 21, 1930. Serial No. 422,319.

This invention relates to devices employed on a train in backing up for sounding a warning signal and for effecting an application of the brakes when desired.

The main object of my invention is to provide an improved device of the above character having an operating handle by which a warning signal may be sounded or the brakes applied at will without removing the hand from the operating handle.

A further object of my invention is to provide an improved device of the above character having means whereby the warning signal may be silenced by the operator at will while effecting an application of the brakes.

In the accompanying drawing; Figure 1 is a diagrammatic view of a fluid pressure brake equipment with my improved warning signal and brake device applied thereto; Fig. 2 is a vertical sectional view of a warning signal and brake device constructed in accordance with my invention; Fig. 3 is a front elevation, partly in section; and Fig. 4 is a rear elevation of same.

As shown in Fig. 1, the improved application and signal control device 1 is associated with the usual fluid pressure brake equipment on a vehicle comprising a brake pipe 4, triple valve device A, a brake cylinder B, and auxiliary reservoir C.

As shown in the drawing, the improved application and signal control may comprise a casing 1 having a valve chamber 2 connected to the usual back-up hose 3 which in turn is connected to the usual automatic train pipe 4. In the valve chamber 2, there is mounted a rotary valve 5 having a stem 6 and a handle 7, mounted on the outer end of same. Shoulders 8 are formed on one face of the rotary valve for receiving lugs 9, carried by the inner end of the stem 6 for rotating the valve 5 upon movement of the handle 7.

Secured to one side of the casing 1 is a valve casing 10 having a bore through which the stem 6 extends and having a valve chamber 11 in which is mounted a poppet valve 12 having a projecting stem 13, the purpose of which will be hereinafter described. A passage 14 leads from chamber 11 to the seat of rotary valve 5 as clearly indicated in Figs. 2 and 3 of the drawing. An exhaust port 15 is formed in the casing 10 and leads to the seat of the rotary valve 5.

In operation, the signal may be sounded by moving the handle 7 and consequently the valve 5 from the lap or off position, as shown in Fig. 3, to whistle position, in which cavity 16 in the valve registers with passage 14, thus allowing fluid under pressure from the brake pipe 4 to flow to chamber 10 and thence to a whistle 17 through a passage 18. A further movement of the handle 7 and valve 5 will cause cavity 16 to register with the exhaust port.

If a service application of the brakes is desired, the valve 5 is moved only so that a restricted communication is provided between the cavity 16 and the exhaust port 15. If an emergency application of the brakes is desired, the rotary valve is moved so that the cavity 16 fully registers with exhaust port 15.

It will be noted that passage 14 remains in registry with cavity 16 when the cavity registers with exhaust port 15, so that normally the whistle blows when the brakes are applied.

When it is desired to make a service or emergency application of the brakes without sounding the warning signal, the projected end 13 of the poppet valve 12 is depressed by the hand which holds the handle 7, thereby closing off passage 14 so the fluid under pressure is prevented from flowing to chamber 11 and the whistle 17 and so long as the valve 12 is held closed, the whistle will be prevented from blowing. A spring 19 in the chamber 11 tends to normally hold the poppet valve unseated when pressure is relieved from the projected end 13.

In Figs. 1 and 2, the combined brake applying and signal device is shown with a hook 20 for supporting the same from a platform rail of a car, not shown in the drawing.

While one illustrative embodiment of the invention has been described in detail, it is not my intention to limit its scope to that embodiment or otherwise than by the terms of the appended claims.

Having now described my invention, what

I claim as new and desire to secure by Letters Patent, is:

1. A back-up hose attachment comprising a fluid pressure operated signal device, a manually operable valve for venting fluid to effect an application of the brakes and at the same time supplying fluid under pressure to the signal device, and another valve normally establishing communication through which fluid is supplied to said signal device and manually operable to close said communication.

2. A back-up hose attachment comprising a valve for venting fluid to effect an application of the brakes, a valve for operating a warning signal and means for operating said brakes and said warning signal, and means for silencing the warning signal while effecting an application of the brakes.

In testimony whereof I have hereunto set my hand, this 17th day of January, 1930.

CLYDE C. FARMER.